Dec. 13, 1938.    O. R. SCHOENROCK    2,140,335
BEARING
Filed Sept. 13, 1935

INVENTOR.
OTTO R. SCHOENROCK
BY John P. Smith
ATTORNEYS.

Patented Dec. 13, 1938

2,140,335

UNITED STATES PATENT OFFICE 2,140,335

BEARING

Otto R. Schoenrock, Chicago, Ill.

Application September 13, 1935, Serial No. 40,357

7 Claims. (Cl. 308—233)

The present invention relates generally to ball bearings, but more particularly to thrust bearings of the type which intermittently receive the thrust load.

The primary object of the present invention is to provide a novel and improved thrust bearing of the assembled type which is capable of receiving and retaining the balls thereof in concentric position in the race grooves of the complementary cooperating race rings.

A further object of the invention is to provide a novel and improved thrust bearing in which the ball retainer has a running fit with the outer peripheral surface of one of the race rings so that the same will secure the benefit of the lubricant discharged outwardly by the action of centrifugal force occasioned by the revolving of the bearings.

A still further and very important feature of my improved thrust bearing is to separate the ball retainer and the free or revolvable ring a sufficient distance from the shaft proper so that in effect there is no bearing or friction between these parts and the shaft and therefore requires no lubrication at this point.

Another object of the present invention is to provide a novel and improved thrust bearing in which the fixed race ring wholly supports the movable race ring and the retainer in spaced relation with respect to the shaft by the outer casing so that all the bearing surfaces thereof are at points adjacent the periphery of the bearing where all the lubricant is retained by reason of the centrifugal action of the revolving bearing.

A still further object of the invention is to provide a novel and improved thrust bearing in which the ball retainer ring may be conveniently made of stamped sheet metal with the depressions for retaining the balls alternately pressed outwardly on the opposite sides of the retainer for maintaining the retainer centrally with respect to the ball eliminating any friction between the retainer and complementary race rings and supporting the ball in concentric relationship with respect to each other and with respect to the complementary race rings.

Another object of the invention is to provide a novel and improved thrust bearing in which the ball retainer is provided with a plurality of concentrically arranged apertures therethrough located between the bearing ball recesses for effectively permitting the lubricant to pass to either side of the bearing.

A still further object of the present invention is to provide a novel and improved construction of thrust bearing in which the retainer as well as the casing embracing the race rings is so constructed that very little clearance is provided between the race rings in order to eliminate the noise.

A yet further object of the invention is to provide a novel and improved bearing in which a felt or similar seal is supported by the casing for retaining the lubricant in the bearing and preventing the entrance of dirt therethrough. The seal also performs the additional function of preventing any noise or rattle by acting as a cushion.

These and other objects are accomplished by providing a construction and an arrangement of the various parts in the manner hereinafter described and particularly pointed out in the appended claims.

Referring to the drawing.

Figure 1:
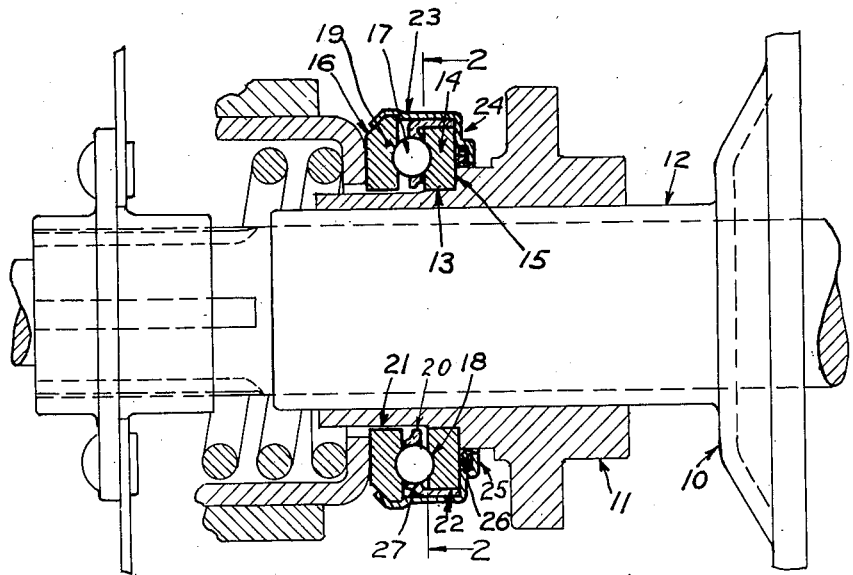
Fig. 1 is a top elevational view partly in cross section of a clutch release bearing for an automobile having my improved bearing mounted therein.

In illustrating one application of my invention, I have shown the same in connection with a conventional form of automobile clutch release generally indicated by the reference character 10 in the drawing. This clutch release includes a sliding or floating hub 11 reciprocally mounted on a stationary tubular support 12. The hub 11 is provided with a reduced portion 13 on which stationary race ring 14 is secured by a driving fit against a shoulder 15 of the hub 11. It will of course, be understood, that the hub 11 is reciprocated by the conventional clutch pedal for engaging and disengaging the clutch mechanism in the manner well understood in the art. The movable or free race ring 16 is spaced from and in cooperative relationship with the stationary race ring 14 by a plurality of bearing balls 17 mounted in concentrically arranged grooves 18 and 19 of the respective rings 14 and 16. These bearing balls 17 are held in spaced relationship by a retainer ring 20 which is preferably though not necessarily constructed of a stamping or sheet metal. In this connection it will be observed that the inner bore of each of the retainer rings 20 as well as the free race ring 16 is considerably larger than the reduced portion 21 of the hub 11 so that in effect neither one of these members contact the shaft or hub 11 and therefore requires no lubrication. Formed integrally with the retainer 20 and extending longitudinally with respect to the axis of the bearing, adjacent the periphery of the retainer, is a bearing flange 22. The inner surface of this cylindrical bearing flange 22 has a running fit with the peripheral surface of the fixed race ring 14 as clearly shown in Fig. 1 of the drawing.

Embracing the bearings so as to form it into a unit assembly is a shell or casing generally indicated by the reference character 23. This shell or casing 23 has a running fit with the outer surface of the flange 22 of the retainer ring 20. Formed integrally with the casing 23 is a radially disposed portion as shown at 24 which projects towards the axis of the shaft and engages one side of the race ring 14 as clearly shown in Fig. 1 of the drawing. Slightly offset with this radially disposed portion is a seal retaining portion 25 which forms an annular recess for a cork or felt seal 26 in the form of a washer. This washer 26 in addition to forming a seal for preventing the lubricant from being discharged from a bearing also serves to cushion the noise and prevents the entrance of dirt in the bearing. In this connection it will be noted that this portion of the shell or casing is sufficiently spaced at the hub so as not to contact therewith. The other end of the shell as shown at 27 embraces the movable race ring and is fixed thereto by spinning the same into the shell.

Figure 2:
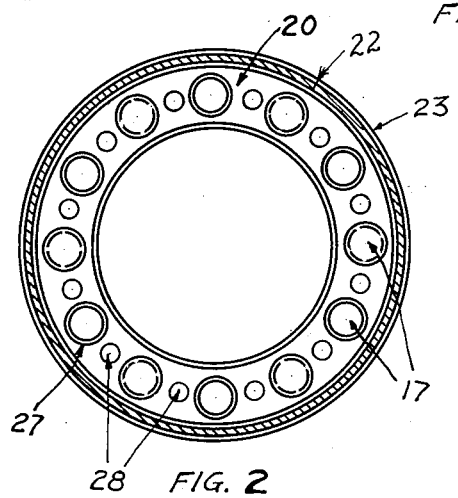
Fig. 2 is a cross sectional view taken on the line 2—2 in Fig. 1.

In order to retain or support the retainer 20 in a plane passing through the axes of all the balls, I have provided the alternate depressions or recesses 27 formed on the opposite sides of the retainer as clearly shown in Figs. 1 and 2 of the drawing. Located between each of these adjacent depressed recesses are apertures 28 through which the lubricant is permitted to flow to either side of the retainer for properly lubricating the race ways and balls as well as the outer portion of the bearing surfaces.

From the above description it will be readily seen that by spacing the free or movable race ring a considerable distance from the shaft so that the same does not bear on the shaft or hub and similarly locating the retainers in a position with respect to the shaft, any friction at this point is eliminated. It will also be noted that by arranging the bearing flange on the retainer ring at the outer edge thereof so that the same has a running fit on the peripheral surface of the fixed race ring 14 and a running fit with respect to the outer casing or shell 23, I have located the bearing portions of the thrust bearing in a position conducive to easy lubrication in that advantage is taken of the centrifugal action of the revolving bearing to deposit the lubricant at the outermost points. In this connection it will also be noted that when the clutch is engaged and the clutch release bearing is under no thrust load the race rings are permitted to move apart as is determined by the clearance between the shell and fixed race ring. The retainer ring with the flange encasing the outer peripheral surface of the fixed ring 14 prevents the bearing balls from becoming disaligned with respect to the concentric race ring grooves upon a slight separation of the race rings. Under the circumstances, the balls will always be retained in concentric alignment with the complementary grooves of the race rings so that whn the thrust load is suddenly assumed there is no radial movement of the balls with respect to the cooperating race grooves in the opposing rings.

Figure 3:
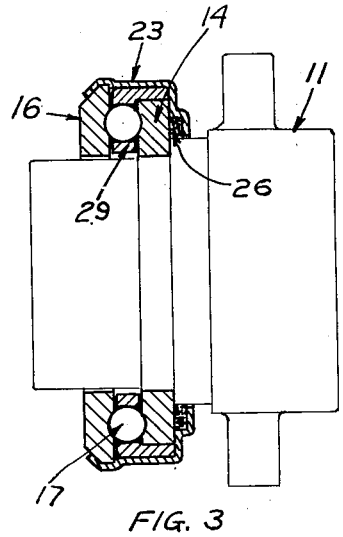
Fig. 3 is a fragmentary top plan view of a clutch release bearing showing a modified form of my improved bearing mounted therein.

In the modified form of my invention shown in Fig. 3 of the drawing, I have disclosed essentially the same construction illustrated in Figs. 1 and 2 of the drawing with the exception that the retainer 29 shown in this view may be made of a self-lubricating metal such as are now more or less commonly used for similar purposes.

While in the above specification I have described one preferred embodiment and one modification of my invention, it will of course be understood that certain other modifications may be made without departing from the spirit and scope of my invention as expressed in the following claims.

What I claim is my invention and desire to secure by Letters Patent is:

1. A thrust bearing comprising a shaft, a race ring secured to said shaft, a complementary race ring loose on said shaft, complementary race grooves in the opposed faces of said rings, an annular row of balls mounted in said grooves, a retainer ring for the balls, a flange on said retainer ring engaging the periphery of one of said race rings for retaining said balls in concentric alignment with the grooves in said race rings, and a shell secured to said loose ring and associated with said fixed ring for holding said loose ring in spaced relation with respect to said shaft.

2. A thrust bearing comprising a shaft, a race ring secured to said shaft, a complementary race ring loose on said shaft, complementary race grooves in the opposed faces of said rings, an annular row of balls mounted in said grooves, a retainer ring for the balls, and a flange at the periphery of said retainer ring and journaled on the periphery of said fixed race ring whereby the centrifugal action of said bearing will cause the lubricant to reach the contacting surfaces.

3. A thrust bearing comprising a shaft, a race ring secured to said shaft, a complementary rotatable race ring mounted concentrically with said first named race ring and spaced from said shaft, complementary race grooves in the opposed faces of said race rings, spaced apart annularly arranged balls mounted in said grooves, a retainer ring positioned between said race rings and spaced from said shaft, said retainer having a longitudinally extending portion journaled on the peripheral surface of said fixed race ring, a shell fixed to said rotatable ring and journaled on the longitudinal portion of said retainer ring, an offset portion formed integrally with said shell adjacent said shaft, and a seal washer mounted in said offset portion for preventing the entrance of dirt to said bearing.

4. A thrust bearing comprising a shaft, a race ring fixed to said shaft, a complementary race ring loose on said shaft, anti-friction members positioned between said rings, a retainer for supporting said anti-friction members, and means contacting the peripheries of said fixed ring and said retainer for wholly supporting all of said parts from said fixed ring.

5. A thrust bearing comprising a shaft, a race ring secured to said shaft, a complementary race ring loose on said shaft, complementary race grooves in the opposed faces of said rings, an annular row of balls mounted in said grooves, a retainer ring for said balls, and means engaging the peripheries of said loose ring and said retainer for wholly supporting said loose race ring and said retainer in spaced relation with respect to said shaft by said fixed race ring.

6. A thrust bearing comprising a shaft, a race ring secured to said shaft, a complementary rotatable race ring spaced from said shaft, complementary race grooves in the opposed faces of said ring, an annular row of balls mounted in said grooves, a retainer ring for said balls spaced from shaft, means formed on the peripheral edge of said retainer ring and extending around said fixed race ring for retaining said balls in concentric alignment with the grooves in said race rings, and a shell fixed to said rotatable ring journaled on said last named means and on said fixed ring whereby the centrifugal action of the revolving bearing will cause the lubricant to reach the contacting surfaces.

7. A thrust bearing comprising a shaft, a race ring secured to said shaft, a complementary rotatable race ring mounted concentrically with said first named ring and having a non-bearing inner surface, complementary race grooves in the opposed faces of said race rings, spaced apart annularly arranged balls mounted in said grooves, a retainer ring positioned between said race rings and spaced from said shaft, said retainer having a longitudinally extending portion journaled on the peripheral surface of said fixed race ring, and a shell fixed to said rotatable race ring and journaled on the extended portion of said retainer ring for encasing said bearing.

OTTO R. SCHOENROCK.